United States Patent
Clauss et al.

(10) Patent No.: US 8,991,144 B2
(45) Date of Patent: Mar. 31, 2015

(54) CONDITIONING DEVICE FOR A FORAGE HARVESTER

(71) Applicant: Deere & Company, Moline, IL (US)

(72) Inventors: Steffen Clauss, Rieschweiler-Muehlbach (DE); Manfred Engel, Grosssteinhausen (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/898,925

(22) Filed: May 21, 2013

(65) Prior Publication Data

US 2013/0305678 A1   Nov. 21, 2013

(30) Foreign Application Priority Data

May 21, 2012  (DE) .................... 10 2012 208 464

(51) Int. Cl.
*A01D 61/00* (2006.01)
*A01D 82/00* (2006.01)
*A01D 43/10* (2006.01)
*A01D 82/02* (2006.01)

(52) U.S. Cl.
CPC ............... *A01D 82/00* (2013.01); *A01D 43/10* (2013.01); *A01D 82/02* (2013.01)
USPC .................................................... 56/16.4 C

(58) Field of Classification Search
USPC ......... 56/6, 7, 249, 294, 252, 253, 12.8, 13.3, 56/14.6, 16.4, 16.4 A, 16.4 C, 16.4 R; 171/129, 132; 241/236, 294, 295, 241/101.742
See application file for complete search history.

(56) References Cited

U.S. PATENT DOCUMENTS

| | | | |
|---|---|---|---|
| 4,039,434 A * | 8/1977 | Croucher | 209/28 |
| 4,708,056 A * | 11/1987 | Dinanath | 99/575 |
| 5,678,396 A * | 10/1997 | Thorman et al. | 56/7 |
| 6,837,183 B2 * | 1/2005 | Aspøy | 119/237 |

FOREIGN PATENT DOCUMENTS

| | | |
|---|---|---|
| DE | 8302421 U1 | 12/1985 |
| DE | 4122338 A1 | 1/1993 |
| DE | 19703486 A1 | 8/1998 |
| DE | 10151246 A1 | 4/2003 |
| DE | 102005053092 A1 | 5/2007 |

* cited by examiner

*Primary Examiner* — Robert Pezzuto

(57) ABSTRACT

A conditioning device for a forage harvester is equipped with a first roller, profiled in the axial direction, and a second roller, also profiled in the axial direction. The two rollers are rotated, around their axes, in opposite directions and are aligned parallel to one another. An element, profiled, in the axial direction, in a manner complementary to the profile of the first roller and adjacent to the circumference of the first roller, for the removal of crop residues from the roller, extends in a circular arc over a part of the circumference of the first roller.

10 Claims, 3 Drawing Sheets

CONDITIONING DEVICE FOR A FORAGE HARVESTER

FIELD OF THE DISCLOSURE

The disclosure concerns a conditioning device for a forage harvester, with a first roller, which is profiled in the axial direction, and a second roller, which is also profiled in the axial direction, wherein the two rollers can be rotated, around their axes, in opposite directions and are aligned parallel to one another and the areas of one roller that have a larger diameter are opposite the areas of the other roller that have a smaller diameter, and with an element, in the axial direction, which is profiled in a manner complementary to the profile of the first roller and adjacent to the circumference of the first roller, for the removal of crop residues from the roller.

BACKGROUND OF THE DISCLOSURE

Forage harvesters are used to harvest whole plants or their parts, which are gathered from the field, during operation, by way of a harvesting attachment, compressed by pre-compression rollers, and are conducted to a chopping drum, whose chopper blades cut the plants, in conjunction with a counter-blade. Subsequently, the cut plants or parts are optionally conducted to a conditioning device and conveyed to a discharge spout, by way of a post-acceleration device; the cut material is then loaded onto a transporting vehicle. The harvested plants, generally, are used as animal fodder or for the production of biogas. The conditioning device usually comprises two or more rollers, driven in opposite directions, which are pre-tensioned, relative to one another, by a spring force and between which, the chopped material is conducted through. It is used during the corn harvest, to beat the grains contained in the chopped material and to improve the digestibility of the fodder.

The rollers of the conditioning device are usually provided with teeth or edges extending in the axial direction, so that a noncircular, profiled cross section of the rollers is obtained (see DE 83 02 421 U1).

Furthermore, embodiments of rollers, profiled in the axial direction, have been proposed, which, for example, have flanks that are composed of straight-line inclined, rising (DE 41 22 338 A1) or stepped (DE 197 03 486 A1) or curved (DE 101 51 246 A1), or curved and straight sections (DE 10 2005 053 092 A1). These rollers also have teeth in the circumferential directions and the areas of one roller that have a larger diameter are located opposite the areas of the other roller that have a smaller diameter, so that the (zigzag or meandering) processing gap between the rollers has at least an approximately constant width over its length. One advantage of these rollers, profiled in the axial direction, is that the processing gap is longer than with rollers that are not profiled in the axial direction. In addition, the radii and thus the circumferential speeds of the points of the rollers, which mostly define the processing gap, differ, which improves the processing of the harvested material.

On the other hand, in a manner different from rollers that are not profiled in the axial direction, crop residues accumulate in the indentations of the rollers profiled in the axial direction, which can be removed only insufficiently by scrapers adapted to the profile of the rollers. Such crop residues rub on the other rollers and on housing elements of the conditioning devices, which increases the wear and tear of the rollers and they can also lead to clogging of the conditioning device.

SUMMARY OF THE DISCLOSURE

The problem which is the basis of the disclosure is to be found in making available a conditioning device with rollers profiled in the axial direction, in which the aforementioned disadvantages do not appear or do so only to a reduced extent.

A conditioning device for a forage harvester comprises a first roller, profiled in the axial direction, and a second roller, which is also profiled in the axial direction. The two rollers can be rotated, around their axes, in opposite directions, and are aligned parallel to one another. The areas of one roller that have a larger diameter are opposite the areas of the other roller that have a smaller diameter. An element for the removal of crop remains from the roller is positioned adjacent to the circumference of the first roller and, in the axial direction, is shaped complementary to the profile of the first roller. The area of the element, which is adjacent to the first roller and extends in the circumferential direction of the roller, has a circular arc shape and extends over a part of the circumference of the first roller. In other words, the element fills the area of the first roller that has a smaller diameter in the axial and circumferential directions and includes, with the first roller in the two aforementioned directions, a relatively small gap, in which only few crop residues or none at all can accumulate.

In this way, crop residues are effectively removed from the first roller. In this way, clogging of the conditioning device needs no longer be feared or occurs more seldom.

Preferably, the rollers are composed of wedge-shaped or cylindrical disks of different sizes, which form an indentation defining an area with a smaller diameter, with an approximately triangular or rectangular cross section, and for this reason, reference is made to the state of the art according to DE 41 22 338 A1, DE 197 03 486 A1, DE 101 51 246 A1, and DE 10 2005 053 092 A1. Each of the indentations of the first roller is correlated with an element.

Several elements can be affixed separately on a holder or are produced, as one piece, with one another and a holder which joins them, for example, in an injection molding process, from plastic. In particular, there is the possibility of placing the element on the inside of a trough extending over a part of the circumference of the first roller or producing it as one piece with the trough. The first roller, which is correlated with the element for the removal of the crop residues, is located, as a rule, below the second roller. The trough, placed below the first roller, prevents the crops from falling downwards onto the field from the forage harvester and being lost to the harvesting process. It would, however, also be conceivable to equip with an element, alternatively or additionally, the second roller placed above the first roller; the element can also be affixed in a trough or on a holder.

BRIEF DESCRIPTION OF THE DRAWINGS

Embodiments of the disclosure are described in detail below with reference to the accompanying drawings wherein.

DETAILED DESCRIPTION OF THE DRAWINGS

Figure 1:
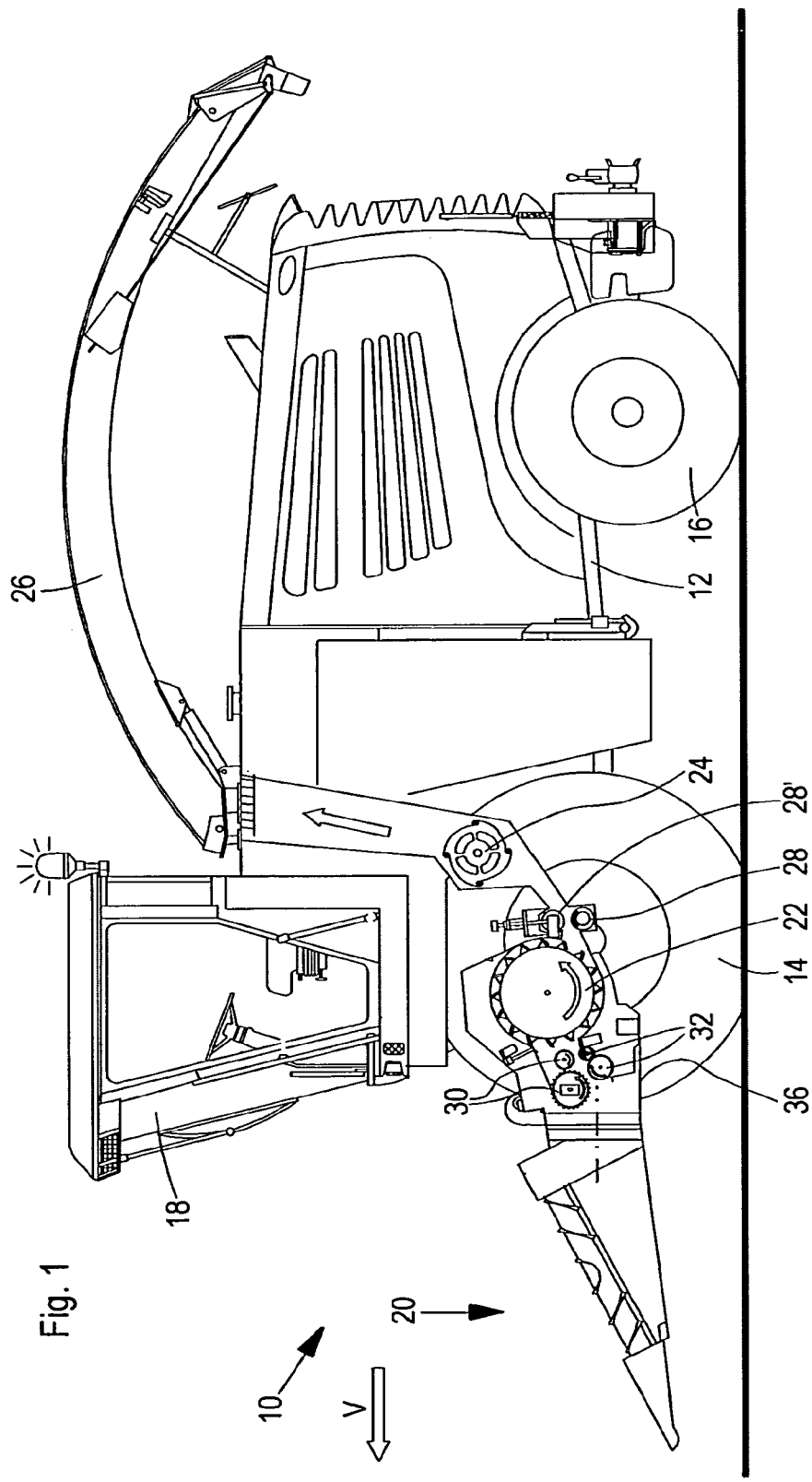
FIG. 1, is a schematic side view of a forage harvester with a conditioning device.

A harvesting machine 10, shown in FIG. 1, in the mode of a self-propelled forage harvester, is built on a frame 12, which is carried by driven front wheels 14 and steerable rear wheels 16. The operation of the harvesting machine 10 is carried out from a driver's cabin 18, from which a harvesting attachment 20, suitable for the harvesting of stem plants, can be seen. By way of the harvesting attachment 20, which, in the embodiment shown, is a corn header, working independent of rows, material gathered from the ground—for example, corn, cereals, or the like, is conducted through upper pre-compression rollers 30 and lower pre-compression rollers 32, to a chopper drum 22, which chops it into small pieces and delivers it to a post-acceleration device 24. The material leaves the harvesting machine 10 to a trailer, travelling alongside, via a discharge device 26, which can be adjusted in its position. Between the chopping drum 22 and the conveying device 24 extends a conditioning device with two conditioning rollers 28, 28', through which the material to be conveyed is tangentially conducted to the conveying device 24. In the following, direction indication—unless otherwise mentioned—such as, front, back, left, and right,—refer to the forward direction V of the harvesting machine 10, which, in FIG. 1, runs from right to left.

Between the crop collecting device 20 and the chopping drum 22, the material is transported through an entry conveyor with lower conveyor rollers 32 and upper conveyor rollers 30, which are placed within an entry housing 36. The conveyor rollers 30, 32 are also designated as pre-compression rollers, since the upper conveyor rollers 30 are pre-tensioned, by spring force, against the lower conveyor rollers 32, so that the crops are pre-compressed between the conveyor rollers 30, 32 and can be cut in a better manner. The chopping blades, distributed over the circumference of the chopping drum 22, act together with a counter-cutter, so as to chop the material.

Figure 2:
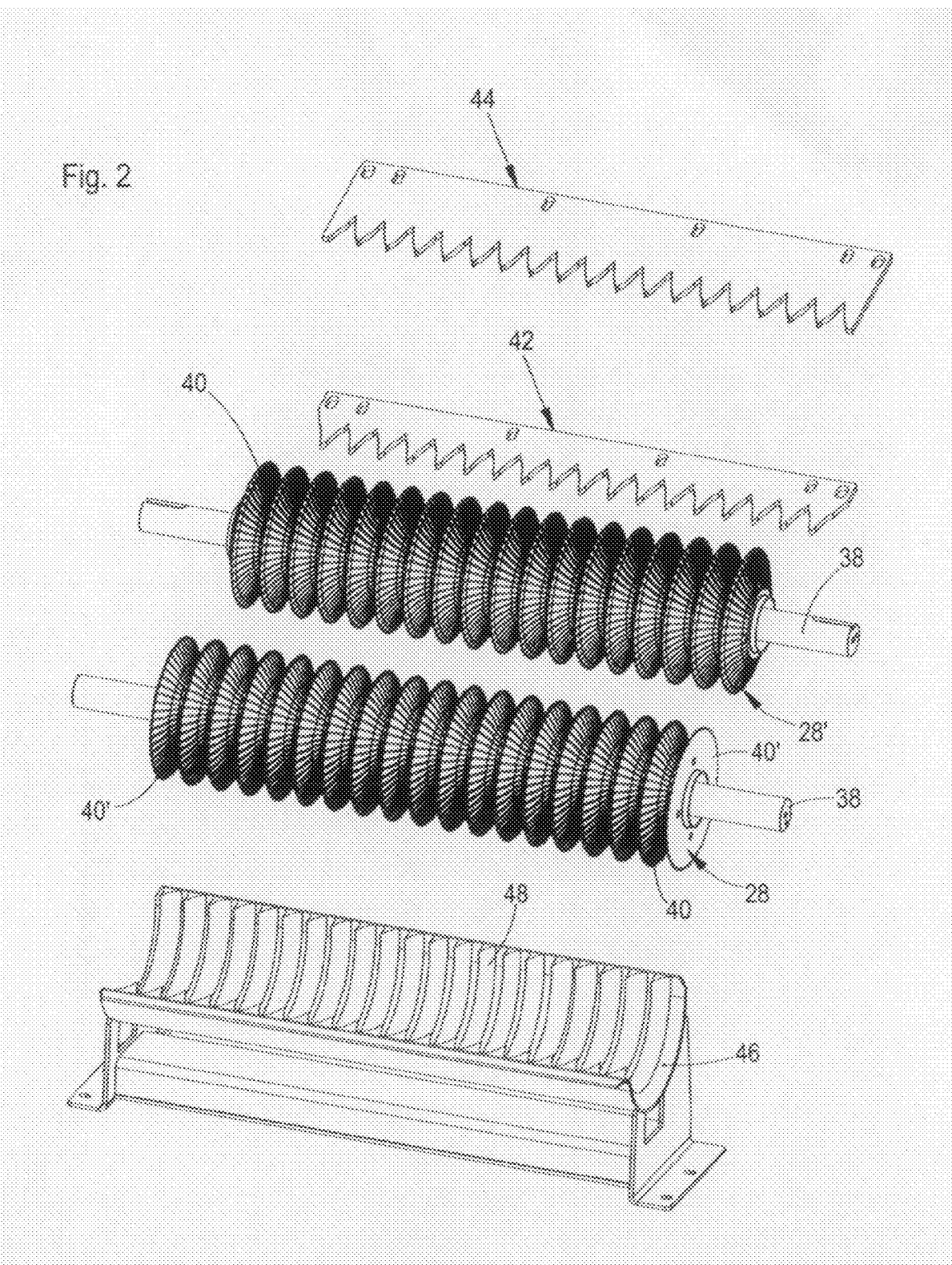
FIG. 2, is a perspective blown-up drawing of the conditioning device.

The rollers 28, 28' of the conditioning device are given in FIG. 2, in a perspective blown-up representation. The rollers 28, 28' comprise a centric shaft 38, on which several disks 40 are mounted in a stationary manner. In the embodiment represented, the disks 40 are inclined, in the axial direction of the shafts 38, on both flanks and have teeth in the circumferential direction, as described in DE 10 2005 053 092 A1. With the lower roller 28, halved disks 40' are placed outside. The disks 40, 40' thus form an undulating profile with sections with a large diameter, which correspond to the crests of waves, and indentations, corresponding to the troughs of waves, in which the rollers 28, 28' form sections with a smaller diameter. The sections with a larger diameter of one roller 28 are placed opposite the indentations of the other roller 28 and vice-versa, so as to attain a processing gap with approximately a constant width over its length for the crops conducted through between the two rollers 28, 28'. During operation, the rollers 28, 28' are driven in opposite directions and the upper roller 28' can escape upwards, against a spring force, opposite the lower roller 28, supported rigidly within the framework of the forage harvester 10.

Figures 4, 5:
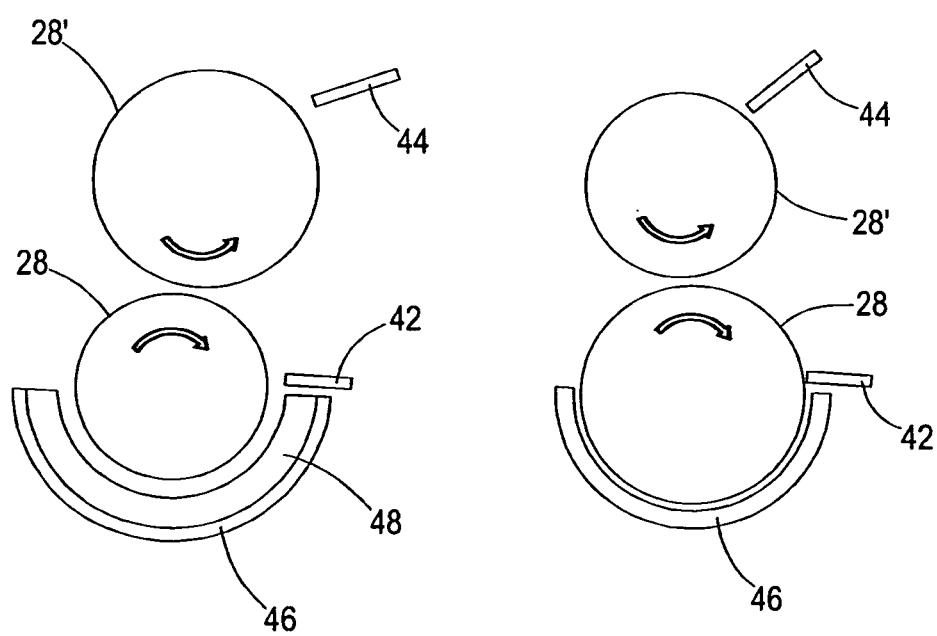
FIG. 4, is a cross section along the line 4-4 of FIG. 3.
FIG. 5, is a cross section along the line 5-5 of FIG. 3.

As shown in FIGS. 4 and 5, scrapers 42, 44 are correlated with the rollers 28, 28' on the discharge end, which are profiled corresponding to the axial profile of the rollers 28, 28'.

Figure 3:
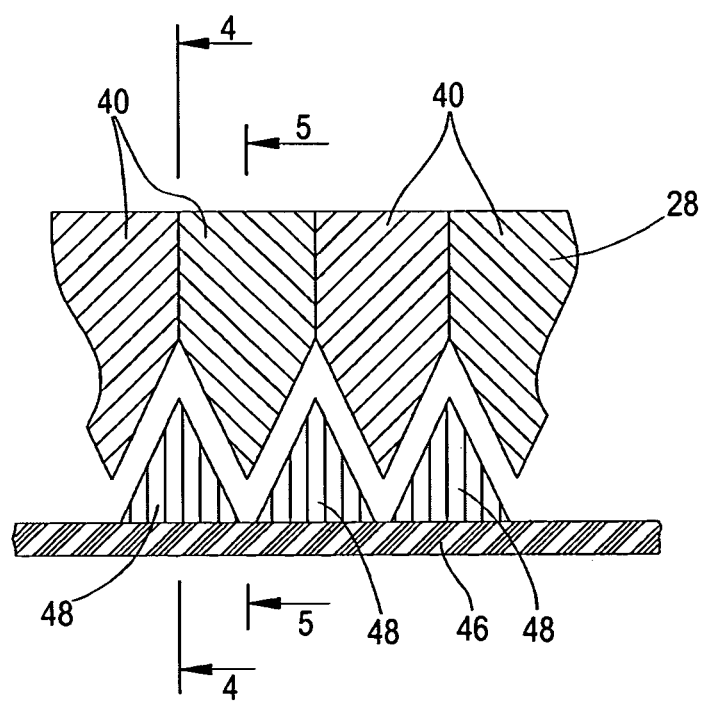
FIG. 3, is an axial cross section through the lower roller of the conditioning device and an element for the removal of crop residues from the roller.

In order to prevent crop residues from accumulating in the indentations of the lower roller 28, in spite of the use of the scraper 42, elements 48 for the removal of crop residues from the roller 28 are placed on the inside of a bottom-side trough 46, which enclose a part of the circumference of the lower roller 28, downwards. The elements 48 are adapted, in the axial direction, to the undulating profile of the roller 28 and are in the shape of a circular arc in the circumferential direction and extend over a sufficient angle range around the lower roller 28—in the embodiment shown, around 180°, although larger or smaller wrap angles would also be possible. The elements 48 thus fill the indentations in the roller 28 in both directions (axial direction and circumferential direction) with relatively small gaps, relative to the roller 28, as one can see with the aid of the axial cross section of FIG. 3 and the radial cross section s of FIGS. 4 and 5, and prevent crop residues from accumulating in the indentations.

The elements 48 can be produced from any material (metal, plastic, or wood) and can be separately affixed on the trough 46, in particular, screwed on it. Alternatively, the trough 46 can be produced as one piece with the elements 48, preferably in an injection molding process, from plastic. It would also be possible to replace the trough 48 with another holder, open downwards (not shown), which is used only to affix the elements 48. Such a holder or another trough 46 with elements 48 could also be correlated with the upper roller 28'.

Having described the preferred embodiment, it will become apparent that various modifications can be made without departing from the scope of the invention as defined in the accompanying claims.

The invention claimed is:

1. A conditioning device for a forage harvester, the conditioning device having a first roller, profiled in the axial direction, and a second roller also profiled in the axial direction, wherein the two rollers are rotated, around their axes, in opposite directions and are aligned parallel to one another and areas of one roller that have a larger diameter are opposite areas of the other roller that have a smaller diameter, and having an element, which is profiled, in the axial direction, in a manner complementary to the profile of the first roller, and is adjacent to the circumference of the first roller, for the removal of crop residues from the roller, wherein the area of the element, adjacent to the first roller extends, in the shape of an arc, over a part of the circumference of the first roller.

2. The conditioning device according to claim 1, wherein the rollers are composed of wedge-shaped disks, between which an indentation, defining an area with a smaller diameter, is formed and each indentation of the first roller is correlated with the element.

3. The conditioning device according to claim 1, wherein several elements are one of separately affixed to a holder and produced as one piece with a holder joining them.

4. The conditioning device according to claim 1, wherein the element is one of placed on the inside of a trough extending over a part of the circumference of the first roller and produced as one piece with the trough.

5. The conditioning device according to claim 4, wherein the trough is located below the first roller and the second roller is positioned above the first roller.

6. A forage harvester with a conditioning device according to claim 1.

7. The conditioning device according to claim 1, wherein the area of the element, adjacent to the first roller extends, in the shape of an arc, over about 180° of the circumference of the first roller.

8. The conditioning device according to claim 1, further comprising:
    a scraper.

9. The conditioning device according to claim 1, further comprising:
    a second element, which is profiled, in the axial direction, in a manner complementary to the profile of the second roller, and is adjacent to the circumference of the second roller, for the removal of crop residues from the second roller, wherein the area of the second element, adjacent to the second roller extends, in the shape of an arc, over a part of the circumference of the second roller.

10. The conditioning device according to claim 9, wherein the area of the second element, adjacent to the second roller extends, in the shape of an arc, over about 180° of the circumference of the second roller.

* * * * *